(12) United States Patent
Glimpel et al.

(10) Patent No.: US 11,229,966 B2
(45) Date of Patent: Jan. 25, 2022

(54) THREAD FORMER HAVING FLARING RIDGES

(71) Applicant: EMUGE—Werk Richard Glimpel GmbH & Co. KG Fabrik Für Präzisionswerkzeuge, Lauf a. d. Pegnitz (DE)

(72) Inventors: Helmut Glimpel, Lauf (DE); Jurgen Fenzel, Simmelsdorf (DE)

(73) Assignee: EMUGE-WERK RICHARD GLIMPEL GMBH & CO. KG FABRIK FÜR PRÄZISIONSWERKZEUGE, Lauf a. d. Pegnitz (DE)

( * ) Notice: Subject to any disclaimer, the term of this patent is extended or adjusted under 35 U.S.C. 154(b) by 161 days.

(21) Appl. No.: 16/667,186

(22) Filed: Oct. 29, 2019

(65) Prior Publication Data

US 2020/0130082 A1    Apr. 30, 2020

(30) Foreign Application Priority Data

Oct. 29, 2018  (DE) .......................... 102018126927.7

(51) Int. Cl.
*B23G 7/02*       (2006.01)

(52) U.S. Cl.
CPC ..................................... *B23G 7/02* (2013.01)

(58) Field of Classification Search
CPC ...... B23G 7/00; B23G 7/02; B23G 2200/142; B23G 2200/146; B23G 2200/16; B23G 2200/30; B23G 2200/44; B23G 2200/46
See application file for complete search history.

(56) References Cited

U.S. PATENT DOCUMENTS

| | | | | |
|---|---|---|---|---|
| 2,991,491 A * | 7/1961 | Welles, Jr. | ............... | B23G 7/02 470/204 |
| 6,217,267 B1 * | 4/2001 | Sugano | .................... | B23G 7/02 408/222 |

(Continued)

FOREIGN PATENT DOCUMENTS

| DE | 10331713 A1 | 2/2005 |
|---|---|---|
| DE | 102005019426 A1 | 10/2006 |

(Continued)

OTHER PUBLICATIONS

Reasons for Refusal for Japanese Application JPWO2018193515, dated Jan. 21, 2021.

(Continued)

*Primary Examiner* — Edward T Tolan
(74) *Attorney, Agent, or Firm* — Workman Nydegger

(57) ABSTRACT

A tool and related method for the non-cutting production or reworking of a thread in/on a workpiece comprises a forming area which is rotatable about a tool axis (A), the forming area having a plurality of pressing lobes protruding or projecting radially outwards away from the tool axis (A) for producing or post-reworking the thread by pressing the pressing lobes into the workpiece surface. The pressing lobes are arranged in succession along a shaping curve which substantially spirally encircles the tool axis (A), and the pitch of the shaping curve corresponds substantially to the pitch of the thread to be produced or reworked. The pressing lobes form at least one pressing ridge, wherein adjacent to the at least one pressing ridge a flaring ridge with a lower height $H_B$ than the height of the pressing ridge $H_D$ is formed.

16 Claims, 3 Drawing Sheets

(56) References Cited

U.S. PATENT DOCUMENTS

| | | | |
|---|---|---|---|
| 9,682,435 B2* | 6/2017 | Yan | B23G 7/02 |
| 9,724,773 B2* | 8/2017 | Glimpel | B23G 7/02 |
| 2012/0301236 A1* | 11/2012 | Ohhashi | B23G 5/20 |
| | | | 408/22 |
| 2020/0230727 A1* | 7/2020 | Harada | B23G 7/02 |

FOREIGN PATENT DOCUMENTS

| | | |
|---|---|---|
| DE | 102012100734 A1 | 8/2013 |
| DE | 102015214932 A1 | 3/2016 |
| DE | 102016009738 A1 | 2/2018 |
| EP | 0767024 A1 | 4/1997 |
| JP | 2019-195222 A | 7/2019 |
| WO | 2018/193515 A1 | 10/2018 |
| WO | 2018193515 A1 * 10/2018 | ............... B23G 7/02 |

OTHER PUBLICATIONS

European Search Report and Search Opinion Received for EP Application No. 19204475.8, dated Mar. 19, 2020, 6 pages.

* cited by examiner

THREAD FORMER HAVING FLARING RIDGES

CROSS-REFERENCE TO RELATED APPLICATIONS

The present invention claims the benefit of priority from German Patent Application No. 10 2018 126 927.7 filed Oct. 29, 2018, the entire content of which is incorporated herein by reference.

BACKGROUND OF THE INVENTION

1. The Field of the Invention

The invention concerns a tool for the non-cutting production or reworking of a thread on a workpiece, in particular a cold-forming tap or thread former. Furthermore, the invention concerns a method for producing a thread.

2. Background and Relevant Art

With these tools, the thread is produced without cutting by forming the workpiece, in that so-called pressing lobes, also known as forming wedges or teeth, cause cold deformation of the workpiece by pressure. Such a pressing lobe has flanks. The advantage of these tools is that the deformation of the surface and the associated strain hardening increases the hardness of the material in the area of the thread profile, resulting in a thread that is more resistant to wear than is the case for cutting thread production.

Known thread formers, especially for internal thread production, comprise a shank and a working area. As a rule, the shank is cylindrical, with the end facing away from the workpiece being received and held in the chuck of a thread forming device. The working area, in particular the forming area, is located on the opposite side of the cold-forming tap from the shank.

The forming area is provided with a shaping curve which spirally encircles the circumference and along which the pressing lobes are formed as elevations.

The pitch angle between two pressing lobes that follow each other along the shaping curve is the same for all pressing lobes in known cold-forming taps. An imaginary linear connecting line between the tips of the pressing lobes along the shaping curve essentially forms a regular n-cornered shape in a projection onto a surface perpendicular to the tool axis with the exception of radial deviations, where n pressing lobes are arranged around the tool axis for each revolution of the shaping curve. Every $n^{th}$ pressing lobe is arranged along a straight line parallel to the tool axis; these pressing lobes arranged along a straight line form what is referred to as a pressing ridge. Cold-forming taps each with different pitch angles are also known. Such a cold-forming tap or thread former is known from DE 10 2012 100 734 A1.

The problem with the known thread formers is that a so-called forming claw is created between the thread turns, particularly when an internal thread is being produced.

DE 10 2016 009 738 A1 discloses a thread-forming method in which a thread is initially produced in a first step, which thread has a so-called forming claw between the thread turns, and then in a second process step the area of the forming claw between the threads is cut out. A disadvantage of the known method is that burrs and/or deformations of the thread can arise in the cut area. The microstructure can be interrupted or cut into during thread cutting and microstructure hardening does not take place over the entire area of the nut thread profile, i.e. internal thread profile. Furthermore, chips can arise in the tapped hole due to cutting. In addition, cutting out is sometimes an unauthorized machining process for prescribed thread forms.

BRIEF SUMMARY OF THE INVENTION

The present invention is based on the object of specifying a novel tool for the non-cutting production of a thread, in particular a novel cold-forming tap or thread former, which enables the non-cutting removal of a forming claw. Furthermore, a method for producing a thread is intended to be specified.

This object is achieved by the features of Claim 1 with regard to the tool and by the features of Claim 9 with regard to the method. Advantageous configurations and developments are indicated in the dependent claims.

The tool according to the invention comprises at least one forming area which is rotatable or rotates about a tool axis for the non-cutting production or reworking of the thread, in particular an internal thread. The forming area has a plurality of pressing lobes protruding or projecting radially outwards away from the tool axis for producing or reworking the thread by pressing the pressing lobes into the workpiece surface. The pressing lobes are arranged in succession along a shaping curve which substantially spirally (or helically) encircles the tool axis. The pitch of the shaping curve corresponds substantially to the pitch of the thread to be produced or reworked.

According to the invention, the pressing lobes form at least one pressing ridge. In the sense of this invention, such a pressing ridge is formed by a plurality of pressing lobes. This can be a straight pressing lobe ridge in which every $n^{th}$ pressing lobe is arranged along a straight line parallel to the tool axis, i.e. at an angle of 360°. Alternatively, it can also be a helical pressing ridge, in which every $n^{th}$ pressing lobe is arranged at an angle of $360°+\Delta\alpha$, where $\Delta\alpha$ is the displacement angle.

Also according to the invention, adjacent to at least one pressing ridge a flaring ridge with a lower height $H_B$ than the height of the pressing ridge $H_D$ is formed.

The height $H_D$ of the pressing ridge is defined as the radial distance between the radius of a tip of the pressing lobe and the tool axis. The height $H_B$ of the flaring ridge is defined via its radial distance to the tool axis. In particular, this is half the diameter of the desired internal thread core diameter produced after the thread forming process. Both the height of the pressing ridge $H_D$ and the height of the flaring ridge $H_B$ are greater than half the core diameter $H_K$ of the tool. This corresponds expediently to the radial distance between two adjacent pressing ridges.

It is advisable for the flaring ridge and the pressing ridge to run parallel to each other. Therefore, if the pressing ridge is helical, a parallel flaring ridge is also helical with the same spiral pitch. The flaring ridge has a substantially uniform profile, especially in its direction of extension. This profile can be for example sinusoidal or parabolic. Expediently, the flaring ridge has the same length along the tool axis as a pressing ridge.

In an alternative configuration, the flaring ridge is formed from two or more partial flaring ridges. If the flaring ridge is formed from partial flaring ridges, each of the partial flaring ridges has to be arranged on the shaping curve after one or between two pressing lobes such that it at least partially deforms the forming claw produced by the preceding pressing lobe. For this purpose, each of the partial flaring ridges has to have a greater length along the tool axis than the pressing lobe preceding the shaping curve.

The advantages of the tool according to the invention lie in the fact that the flaring ridge sweeps over the thread turns with each revolution and thereby presses in a forming claw that is formed between the thread turns in the area of the internal thread core diameter.

In one configuration, the pressing lobes are arranged in at least two pressing ridges and the tool has at least two flaring ridges, which are each arranged between two pressing ridges.

In a further configuration, the flaring ridge has a height $H_B$ which lies between half a core diameter $H_K$ of the tool and the height $H_D$. In particular, the flaring ridge has a height $H_B$ such that the flaring ridge at least partially presses in a forming claw. Such a height $H_B$ has proven to be particularly advantageous for effectively avoiding of forming claws.

The reducing of the forming claw or its complete reduction is influenced by a change in a thread pre-manufacturing diameter, e.g. pilot hole diameter. If the thread pre-manufacturing diameter is chosen to be smaller, more material to be formed is present between the thread flanks of the tool and is thus displaced in the direction of the tool axis. Now more material can be deformed by means of the flaring ridge and the forming claw may possibly close completely.

According to one variant, the at least one pressing ridge and the at least one flaring ridge extend parallel to the tool axis. The pressing ridge and the flaring ridge thus extend as a straight line.

According to a further variant, the at least two flaring ridges are arranged symmetrically with respect to the tool axis A. Thus, in a tool with two flaring ridges, the flaring ridges would be arranged at an angle of 180°, and in the case of three flaring ridges at an angle of 120° between the flaring ridges.

In one configuration, a plurality of pressing ridges are arranged between two flaring ridges. Thus, for example, two, three, four or more pressing ridges can also be arranged between two flaring ridges.

In another variant, a pitch angle between a pressing ridge and/or flaring ridge and the following pressing ridge and/or flaring ridge in the circumferential direction is substantially the same. In other words, the pitch angle between two consecutive ridges in the circumferential direction is the same, regardless of whether the ridge is a pressing ridge or a flaring ridge.

In another variant, a pitch angle between a pressing ridge and/or flaring ridge and the following pressing ridge and/or flaring ridge in the circumferential direction is substantially different.

In another variant, the core diameter of the tool can be increased to such an extent that it produces the desired internal thread core diameter.

In another variant, one or more pressing lobes in one or more pressing ridges can be reduced in size or removed to prevent the material from jamming. For example, when viewed from a tool tip, the third pressing lobe in one pressing ridge and the fifth pressing lobe in a second pressing lobe ridge may have a reduced height or be missing.

The method according to the invention for producing an internal thread comprises the following iteratively repeating steps:
 pressing in a thread by means of one or more pressing lobes with a rotating tool, and
 subsequently forming the interspace between the threads with a flaring ridge.

In particular, the method can be carried out with the tool according to the invention.

Expediently, a pilot hole with a thread pre-manufacturing diameter is produced before the thread is pressed in.

BRIEF DESCRIPTION OF THE DRAWINGS

The invention will be explained in more detail below with regard to further features and advantages by means of the description of exemplary embodiments and with reference to the appended drawings, in which.

DETAILED DESCRIPTION OF THE PREFERRED EMBODIMENTS

Parts and parameters that correspond to each other are indicated in the figures with the same reference signs.

Figure 1:
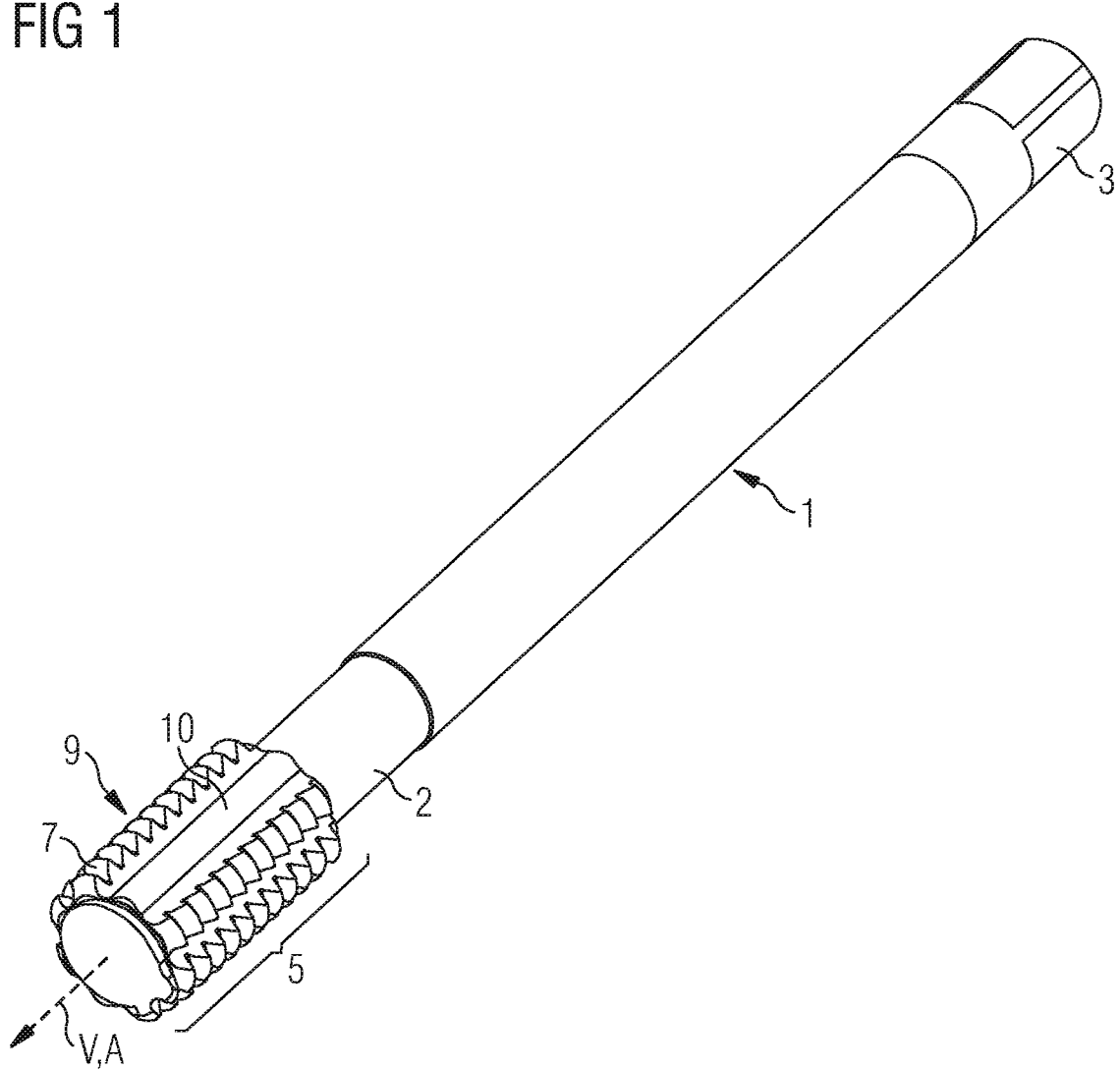
FIG. 1 shows a perspective view of an exemplary embodiment of a cold-forming tap according to the invention

FIG. 1 shows a cold-forming tap 1 according to the invention, comprising a tool shank 2 and a working area, the forming area 5. A tool axis A, which also represents a rotation axis of the cold-forming tap 1, runs parallel to the longitudinal extension of the cold-forming tap 1 through the centre of the cold-forming tap 1. A feed direction V of the cold-forming tap 1 runs parallel to the tool axis A and is indicated by the direction of the arrow in FIG. 1. The cold-forming tap 1 is used for non-cutting internal thread production.

The tool shank 2 can be for example cylindrical and usually has a square 3 on the side inserted in the chuck in order to transfer the cutting torque. The tool shank 2 is in this case firmly connected to the adjacent forming area 5, in particular the tool shank 2 and the forming area 5 are embodied in one piece.

In the forming area 5, numerous pressing lobes 7 along a shaping curve 6 are formed on a tool core as shaping thread. The shaping curve 6 runs spirally or helically, i.e. with a pitch, around the tool axis A. The pressing lobes 7 each have a tip 8 (also referred to as the head) at their free outer end. The pressing lobes 7 are arranged axially offset along the tool axis A along the shaping curve 6 and thus an account of the pitch of the shaping curve 6.

In the embodiment shown, the pressing lobes 7 are arranged in six pressing ridges 9. This means that six pressing lobes are arranged in one revolution along the shaping curve 6. The pressing ridges 9 are arranged parallel to the tool axis A. FIG. 1 also shows two flaring ridges 10, which are also arranged parallel to the tool axis A on opposite sides of the shank.

Figure 2:
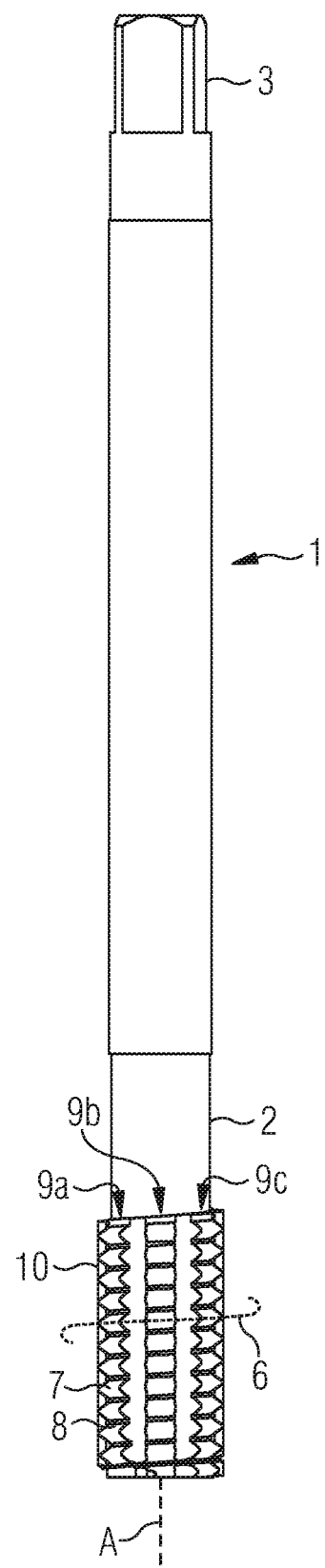
FIG. 2 shows another view of the exemplary embodiment from FIG. 1 of the cold-forming tap and FIG. 3 shows a projection of the exemplary embodiment from FIG. 1 of a tool according to the invention in a plane perpendicular to the tool axis, in a direction of view counter to a feed direction of the tool.

FIG. 2 shows a projection of the embodiment shown in FIG. 1. The pressing ridges 9a, 9b, 9c are arranged next to each other. The flaring ridges 10 are illustrated in each case next to the pressing ridge 9a and next to the pressing ridge 9c in the projection shown at the upper and lower edge of the cold-forming tap 1 shown.

Figure 3:
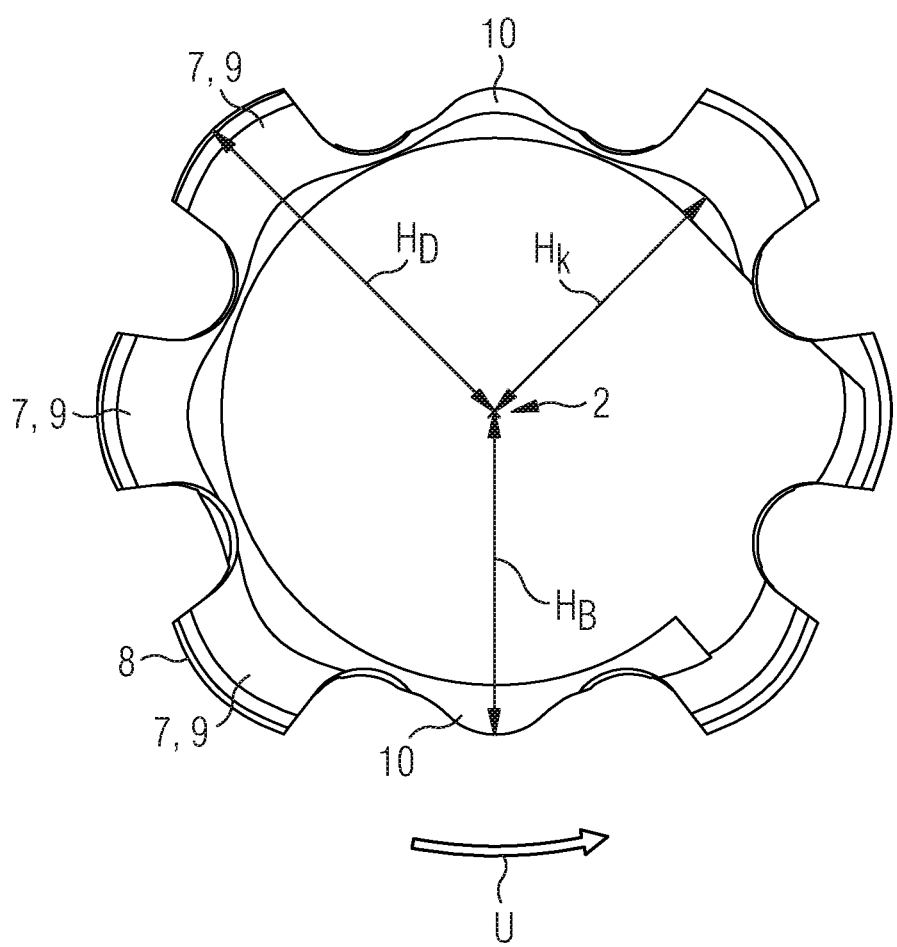

FIG. 3 shows a projection of the exemplary embodiment of a tool according to the invention in a plane perpendicular to the tool axis, in the direction of view counter to a feed direction of the tool. In the projection, three pressing lobes 7 are arranged next to each other respectively. The pressing lobes 7 are arranged in pressing ridges 9. The flaring ridges 10 are arranged between the groups of three pressing ridges 7 each. The flaring ridges 10 have a height $H_B$ which is lower than the height $H_D$ of the pressing ridges 9 but greater than half the core diameter $H_K$ of the tool. When the cold-forming tap rotates, first of all a thread is pressed with the pressing lobes. The following flaring ridge 10 in the direction of rotation U has such a height that it does not reach the already formed thread, but the area between the thread turns. The material located between the thread turns is pressed radially outwards and, if necessary, partially into the thread turns, so that the formation of forming claws located between the thread turns is reversed. Continuing in rotation, the thread turn is further formed with the three following pressing lobes 7. The area between the thread turns is again contacted with the following flaring ridge 10. As a result of the iterative processing of the thread turns and of the area between the thread turns, a thread can be produced in which no reworking is necessary by subsequent cutting or drilling of an inner area for the removal of forming claws. In a configuration individual pressing lobes may be missing or be smaller in size in order to prevent jamming.

REFERENCE NUMBER LIST

1 Tool for material processing, cold-forming tap
2 Tool shank
3 Square
5 Shaping area
6 Shaping curve
7, 7a, 7b, 7c Pressing lobes
8 Tip of the pressing lobe
9, 9a, 9b, 9c Pressing ridge
10 Flaring ridge
A Tool axis
V Feed direction
$H_B$ Height of flaring ridge
$H_D$ Height of pressing ridges
$H_K$ Half core diameter of the tool

We claim:

1. A tool for the non-cutting production or reworking of a thread in or on a workpiece, the tool comprising:
    at least one forming area which is rotatable or rotates about a tool axis for the non-cutting production or reworking of the thread;
    wherein the at least one forming area comprises
        a flaring ridge protruding or projecting radially outwards away from the tool axis;
        a plurality of pressing lobes protruding or projecting radially outwards away from the tool axis for producing or reworking the thread by pressing the pressing lobes into the workpiece surface;
        the pressing lobes being arranged in succession along a shaping curve which spirally encircles the tool axis;
        a pitch of the shaping curve corresponding to a pitch of the thread; and
        the pressing lobes including at least one pressing ridge adjacent to the flaring ridge, a height of the flaring ridge being lower than a height of the least one pressing ridge, and the height of the flaring ridge being a height at which an internal thread core diameter is formed.

2. The tool according to claim 1, wherein:
    the pressing lobes are arranged in at least two pressing ridges; and
    the tool has at least two flaring ridges, which are each arranged between two pressing ridges.

3. The tool according to claim 1, wherein the height of the flaring ridge is between half a core diameter of the tool and the height of the pressing ridge.

4. The tool according to claim 1, wherein the at least one pressing ridge and the flaring ridge extend parallel to the tool axis.

5. The tool according to claim 2, wherein the at least two flaring ridges are arranged symmetrically with respect to the tool axis.

6. The tool according to claim 2, wherein a plurality of pressing ridges is arranged between two flaring ridges.

7. The tool according to claim 1, wherein pitch angles are the same between the at least one pressing ridge and/or the flaring ridge and a following pressing ridge in the circumferential direction and/or a following flaring ridge in the circumferential direction.

8. The tool according to claim 1, wherein one or more pressing lobes in one or more pressing ridges are removed or reduced in size relative to other pressing lobes of the tool.

9. The tool according to claim 1, wherein
    the flaring ridge extends along an entire length of at least one pressing ridge and/or
    the flaring ridge is formed from two or more partial flaring ridges, each partial flaring ridge being arranged on the shaping curve and having a greater length in the direction of the tool axis than the preceding pressing ridge on the shaping curve.

10. The tool according to claim 1, wherein the height of the flaring ridge is adapted for forming the interspace between the threads for partially reversing a formation of forming claws, the forming claims being formed in the thread by the at least one preceding pressing.

11. The tool according to claim 1, wherein the flaring ridge has a uniform profile in its direction of extension along the tool axis.

12. The tool according to claim 1, wherein
    the flaring ridge extends along an entire length of the at least one pressing ridge and/or
    the flaring ridge is formed from two or more partial flaring ridges, each of the two or more partial flaring ridges having a greater length along the tool axis than a preceding pressing lobe on the shaping curve such that, after the preceding pressing lobe forms a forming claw in the thread, one of the two or more partial flaring ridges at least partially deforms the forming claw produced by the preceding pressing lobe.

13. A method for producing an internal thread, the method comprising:
    pressing in a thread in a work piece, the thread being pressed in using one or more pressing lobes of a rotating tool;
    then, after pressing in the thread, forming an interspace between the thread using a flaring ridge of the rotating tool; and
    iteratively repeating the steps of pressing in the thread and then forming the interspace between the thread, wherein
    the rotating tool is for non-cutting production or reworking of the thread in or on the workpiece, the rotating tool including
        at least one forming area which is rotatable or rotates about a tool axis for the non-cutting production or reworking of the thread, wherein the forming area includes
            the one or more pressing lobes, which are protruding or projecting radially outwards away from the tool axis for producing or reworking the thread by pressing the one or more pressing lobes into the workpiece surface, the one or more pressing lobes being arranged in succession along a shaping curve that spirally encircles the tool axis;

a flaring ridge arranged in the forming area and protruding or projecting radially outwards away from the tool axis;

a pitch of the shaping curve corresponding to a pitch of the thread; and the pressing lobes including at least one pressing ridge adjacent to the flaring ridge, a height of the flaring ridge being lower than a height of the pressing ridge, and the height of the flaring ridge being a height at which an internal thread core diameter is formed.

14. The method according to claim 13, wherein the iteratively repeating the steps of pressing in the thread and then forming the interspace between the thread is performed using the rotating tool in which the height of the flaring ridge corresponding to an inner radius of the thread.

15. The method according to claim 13, wherein the iteratively repeating the steps of pressing in the thread and then forming the interspace between the thread is performed using the rotating tool in which the flaring ridge has a uniform profile in its direction of extension along the tool axis.

16. The method according to claim 13, wherein the iteratively repeating the steps of pressing in the thread and then forming the interspace between the thread is performed using the rotating tool in which the flaring ridge extends along an entire length of the at least one pressing ridge and/or the flaring ridge is formed from two or more partial flaring ridges, each of the two or more partial flaring ridges having a greater length along the tool axis than a preceding pressing lobe on the shaping curve such that, after the preceding pressing lobe forms a forming claw in the thread, one of the two or more partial flaring ridges at least partially deforms the forming claw produced by the preceding pressing lobe.

* * * * *